United States Patent
Lin et al.

(10) Patent No.: US 7,590,037 B2
(45) Date of Patent: *Sep. 15, 2009

(54) METHOD AND APPARATUS FOR DECODING ENCODED DATA AROUND A DISCONTINUED AREA ON AN OPTICAL STORAGE MEDIUM

(75) Inventors: Meng-Hsueh Lin, Taipei Hsien (TW); Chin-Huo Chu, Kao-Hsiung Hsien (TW); Chia-Wen Lee, Taipei Hsien (TW)

(73) Assignee: MediaTek Inc., Hsin-Chu (TW)

( * ) Notice: Subject to any disclaimer, the term of this patent is extended or adjusted under 35 U.S.C. 154(b) by 513 days.

This patent is subject to a terminal disclaimer.

(21) Appl. No.: 11/552,992

(22) Filed: Oct. 26, 2006

(65) Prior Publication Data
US 2007/0047413 A1    Mar. 1, 2007

Related U.S. Application Data

(63) Continuation-in-part of application No. 10/906,773, filed on Mar. 6, 2005, now Pat. No. 7,145,852.

(51) Int. Cl.
*G11B 20/10* (2006.01)
(52) U.S. Cl. ............ 369/47.19; 369/47.27; 369/47.32; 369/47.14
(58) Field of Classification Search ............... 369/47.14, 369/47.19, 47.27, 47.32, 47.48, 53.17, 53.31, 369/59.15, 59.23, 124.04, 124.07
See application file for complete search history.

(56) References Cited

U.S. PATENT DOCUMENTS

| | | | |
|---|---|---|---|
| 5,508,993 A * | 4/1996 | Hayashi et al. | 369/59.22 |
| 6,298,030 B1 | 10/2001 | Maeda | |
| 2005/0117484 A1* | 6/2005 | Tatsuzawa et al. | 369/47.14 |
| 2005/0265181 A1 | 12/2005 | Yen | |
| 2006/0023601 A1 | 2/2006 | Tachino | |

FOREIGN PATENT DOCUMENTS

| | | |
|---|---|---|
| TW | 200403645 | 3/2004 |
| TW | 200540851 | 12/2005 |

* cited by examiner

*Primary Examiner*—Thang V Tran
(74) *Attorney, Agent, or Firm*—Winston Hsu

(57) ABSTRACT

A method for decoding encoded data around a specific area on an optical storage medium, wherein the specific area has discontinued data. The method includes: detecting at least one type of sync patterns within the encoded data; determining an offset value corresponding to the specific area according to the detected sync patterns; and decoding the encoded data according to the offset value for generating decoded data.

20 Claims, 5 Drawing Sheets

METHOD AND APPARATUS FOR DECODING ENCODED DATA AROUND A DISCONTINUED AREA ON AN OPTICAL STORAGE MEDIUM

CROSS REFERENCE TO RELATED APPLICATIONS

This is a continuation-in-part of a co-pending U.S. patent application Ser. No. 10/906,773, which was filed on Mar. 6, 2005 and is included herein by reference.

BACKGROUND

The present invention relates to optical storage devices, and more particularly, to a method and apparatus for decoding encoded data around a discontinued area on an optical storage medium.

Data can be repeatedly recorded on an optical storage medium such as a DVD+RW disc, a DVD-RW disc, or a Blu-ray disc. This means that multiple sets of data can be recorded on the optical storage medium at various times. In an ideal case, a boundary of a second set of data recorded after a first set of data is right next to the first set of data so the adjacent sets of data appear to be continuous. In other words, there is no overlap or blank region around the linking area of the adjacent sets of data.

In reality, however, there usually exists an overlap or blank region around the linking area of the adjacent sets of data due to certain factors such as inaccuracy of a clock signal or occurrence of an error during addressing. In the worst case, the overlap region introduces a decoding error of recorded data corresponding to a whole error correction unit, e.g. an error correction code (ECC) block (for DVD+RW discs or DVD-RW discs) or a cluster (for Blu-ray discs), if too many portions within the error correction unit are shifted due to the overlap region.

SUMMARY

A method and apparatus for decoding encoded data around a specific area on an optical storage medium, wherein the specific area has discontinued data, are disclosed. According to one embodiment of the present invention, the method comprises: detecting at least one type of sync patterns within the encoded data; determining an offset value corresponding to the specific area according to the detected sync patterns; and decoding the encoded data according to the offset value for generating decoded data.

According to one embodiment of the present invention, the apparatus comprises: a sync pattern detector for detecting at least one type of sync patterns within the encoded data; an offset detector coupled to the sync pattern detector for determining an offset value corresponding to the specific area according to the detected sync patterns; and a decoding module coupled to the offset detector for decoding the encoded data according to the offset value to generate decoded data.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
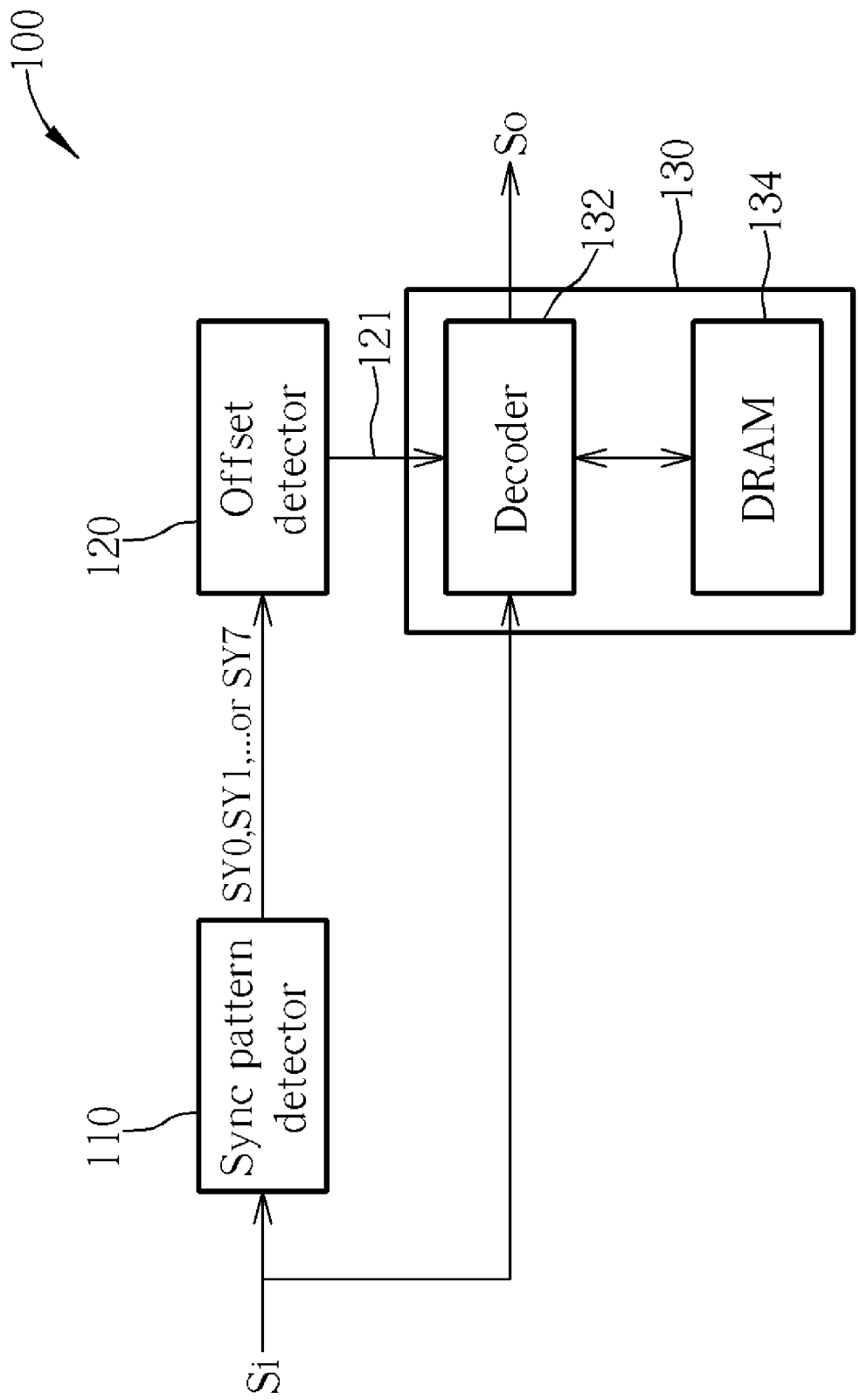
FIG. 1 is a diagram of an apparatus for decoding encoded data around a linking area on an optical storage medium according to an embodiment of the present invention.

Please refer to FIG. 1. FIG. 1 is a diagram of an apparatus 100 for decoding encoded data around a specific area on an optical storage medium according to a first embodiment of the present invention, wherein the specific area has discontinued data. Please note that the specific area in this embodiment is the linking area on the optical disc storage medium. An optical storage device for accessing the optical storage medium reads the encoded data utilizing a pickup head and generates an encoded data signal Si carrying the encoded data. In this embodiment, the optical storage medium is a DVD-RW disc and the optical storage device is a DVD-RW drive. Accordingly, the encoded data signal Si is an EFM+ data signal.

According to this embodiment, the apparatus 100 is installed in the optical storage device. The apparatus 100 comprises a sync pattern detector 110, an offset detector 120, and a decoding module 130, where the decoding module 130 comprises a decoder 132 and a Dynamic Random Access Memory (DRAM) 134. As shown in FIG. 1, the sync pattern detector 110 detects at least one type of sync patterns within the encoded data carried by the encoded data signal Si. Discontinued data may result in discontinued sync patterns, therefore in the following embodiments, the sync pattern detector 110 detects the sync patterns to discover if there is discontinued data. In a simplest case, the sync pattern detector 110 may detect only one type of sync patterns SY0 out of all types of sync patterns SY0, SY1, . . . , SY7 shown in FIG. 1, where the sync patterns SY0 are expected to be detected in the beginning of each sector of the encoded data. In this manner, the offset detector 120 receives the location of sync patterns SY0 detected by the sync pattern detector 110 and determines at least one offset value carried by an offset information signal 121. It is noted that the offset value should be a regular value except in the case of a linking area where there exists any abnormal phenomenon such as an overlap or blank region mentioned above. The offset detector 120 of this embodiment is capable of determining the offset value corresponding to the linking area according to the positions of the detected sync patterns SY0 to notify the decoding module 130 of the abnormal phenomenon. As a result, the decoding module 130 decodes the encoded data carried by the encoded data signal Si according to the offset value to generate decoded data, which is outputted in an output signal So.

Figure 2:
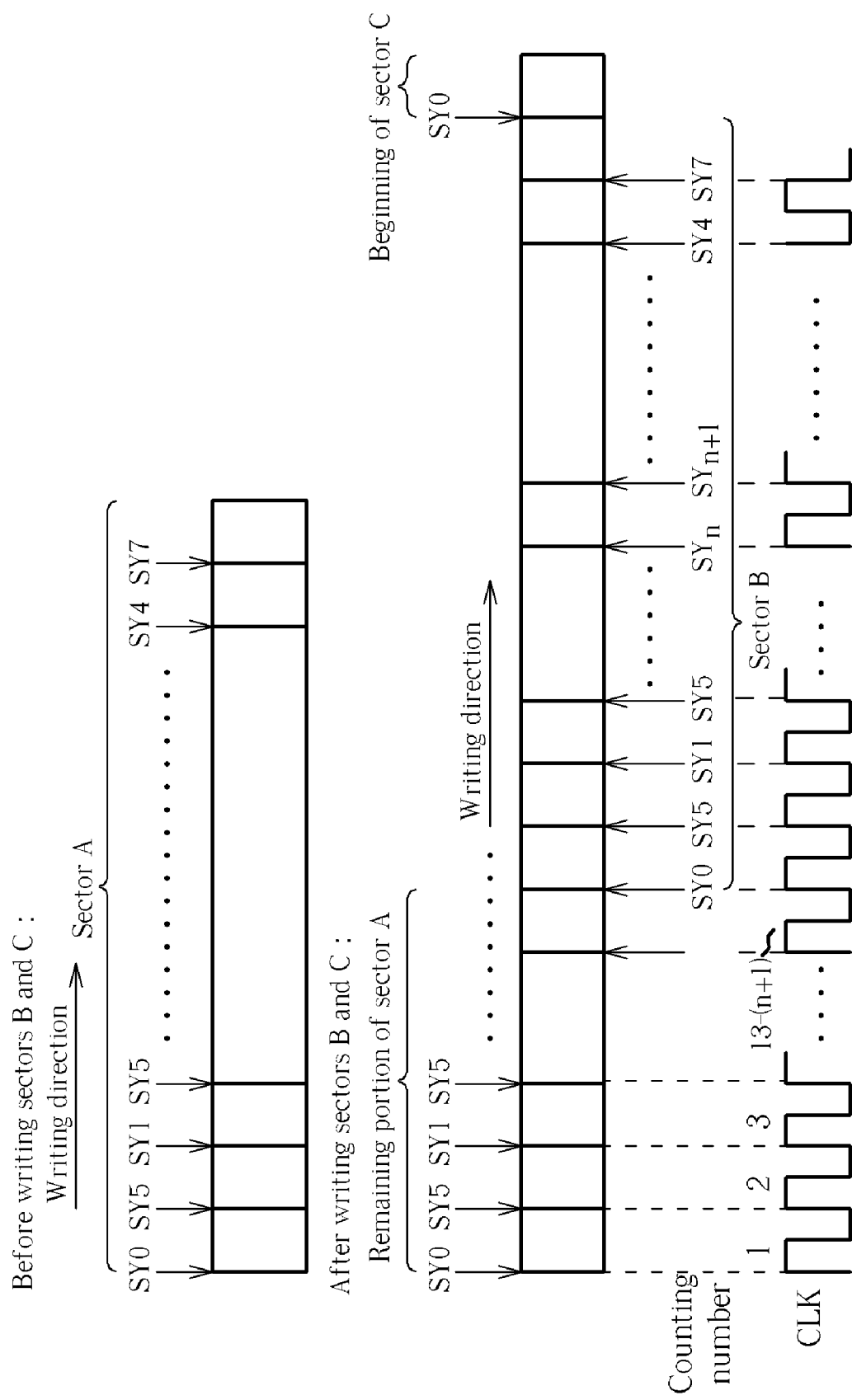
FIG. 2 represents a portion of encoded data around a linking area on an optical storage medium according to an embodiment.

FIG. 2 represents a portion of encoded data around a linking area on the optical storage medium according to the first embodiment, where a portion of sector A located at the ending of a first set of data recorded at a first time is erased while sector B located at the beginning of a second set of data recorded at a second time is written on the optical storage medium. If the offset value is generated according to detection of the offset between sync pattern SY0 of sector A and sync pattern SY0 of sector B, the offset value will not be a regular value corresponding to the period of a normal sector. Please note that a reference clock CLK, which can be an internal clock of the optical storage medium, is synchronized with the sync patterns of sector A and sector B, as illustrated in FIG. 2. For example, the clock cycle 1 is synchronized with SY0 of sector A, the clock cycle 2 is synchronized with SY5 of sector A, and so on. Furthermore, the number of sync patterns SY0, SY5, . . . , SY7 of each sector of the optical storage medium is normally a fixed number; for example, there are 13 sync patterns in both sector A and sector B respectively. Therefore, a counter can be utilized for counting the clock cycles of the reference clock CLK between two sync patterns SY0 of sector A and sector B in order to determine if there is abnormity in sector A or sector B. In this situation, sync patterns SY0, SY5 SY1, SY5, . . . , SYn, and SYn+1 of sector B are overlapped to the end part of sector A, and the offset value will be an abnormal value. The total clock number of the reference clock CLK between two sync patterns SY0 of sector A and sector B, which is the offset value, is less than the regular value of 13. Accordingly, the offset detector 120 determines the offset value between sector A and sector B. After receiving the offset value carried by the offset information signal 121, the decoding module 130 is notified of the situation shown in FIG. 2. Please note that the present invention is not limited to utilize the counter for counting the reference clock CLK between two sync patterns SY0 of sector A and sector B, and any other method capable of determining the offset value between sector A and sector B can be adopted. This still belongs to the scope of the present invention.

Figure 3:
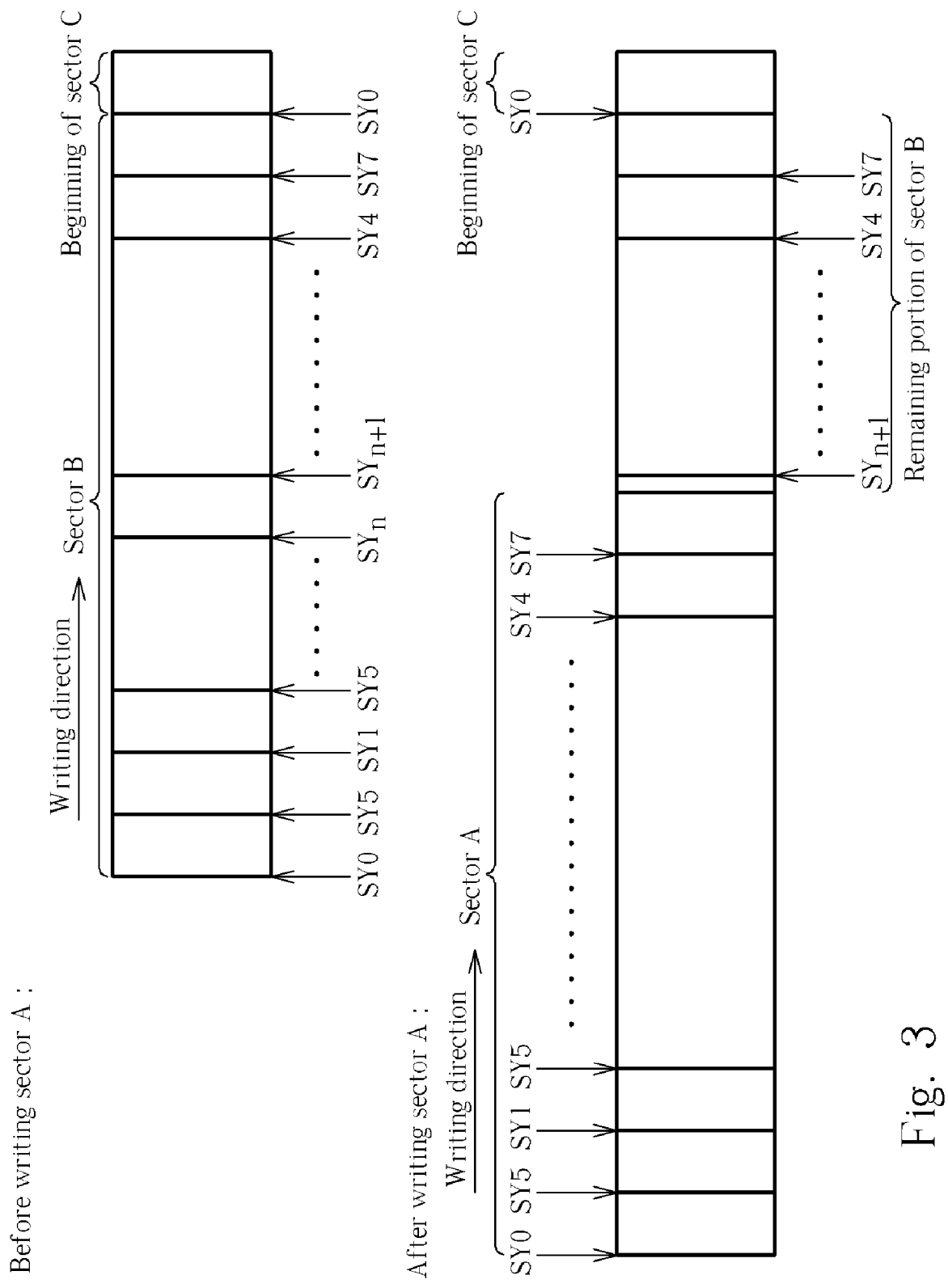
FIG. 3 represents a portion of encoded data around another linking area on an optical storage medium according to an embodiment.

FIG. 3 represents a portion of encoded data around another linking area on another optical storage medium similar to the previous one according to the first embodiment, where a portion of sector B located at the beginning of a third set of data recorded at a third time is erased while sector A located at the ending of a fourth set of data recorded at a fourth time is written on this optical storage medium. If the offset value is generated according to detection of the offset between sync pattern SY0 of sector A and sync pattern SY0 of sector C adjacent to sector B as shown in FIG. 3, the offset value will not be the regular value corresponding to the period of a normal sector. In this situation, the offset value will be an abnormal value and will be greater than the regular value. After receiving the offset value carried by the offset information signal 121, the decoding module 130 is notified of the situation shown in FIG. 3. Please note that the above-mentioned method of utilizing a counter to count the clock number of the reference clock CLK between two sync patterns SY0 of sector A and sector C in order to determine the overlapped area between sector A and sector C is also possible in this situation, and those persons skilled in the art will readily understand the operation associated with the offset value determination after reading the description of FIG. 2.

Figure 4:
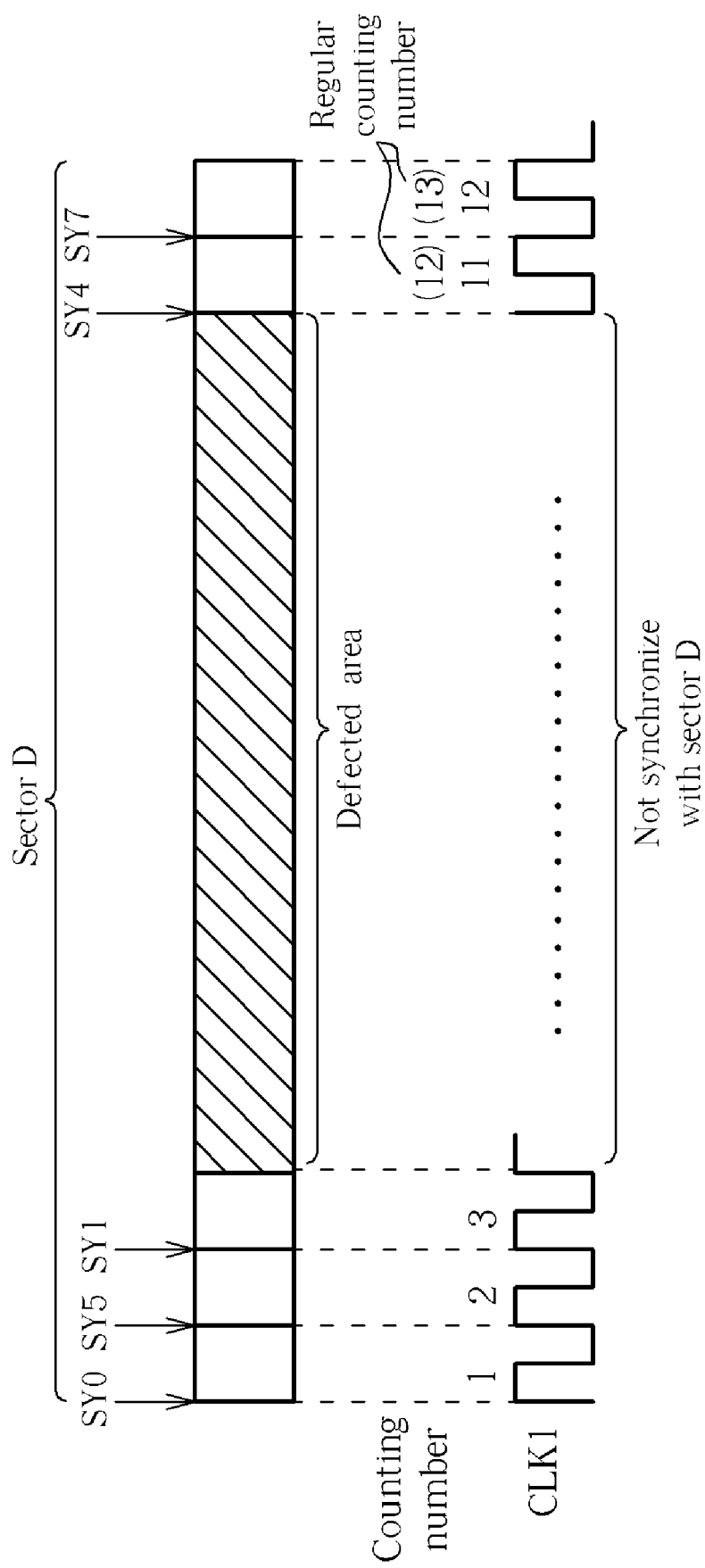
FIG. 4 represents a portion of encoded data around a defected area on an optical storage medium according to an embodiment.

FIG. 4 represents a portion of encoded data around a defected area on the optical storage medium according to a second embodiment, where the defected area is a portion of sector D. When the encoded data of the sector D is read, sync patterns of sector D are counted by a counter. Please note that a reference clock CLK1, which can be an internal clock of the optical storage medium, is synchronized with the sync patterns at the beginning of sector D when the encoded data of the sector D is read. As shown in FIG. 4, clock cycle 1, clock cycle 2, and clock cycle 3 are synchronized with SY0, SY5, and SY1 of sector D respectively. Therefore, the counter counts the clock cycles of the reference clock CLK1 that is supposed to be synchronized with the sync patterns of sector D. In other words, when the sync pattern detector 110 detects the sync pattern SY0, the counter increments a counter value by one according to the clock cycle 1 to make the counter value become one if the initial value is zero; when the sync pattern detector 110 detects the next sync pattern SY5, the counter further increments the counter value by one according to the clock cycle 2, and so on. When the sync pattern detector 110 detects the defected area of sector D (shaded area in FIG. 4), however, the reference clock CLK1 is not synchronized with the sync pattern of sector D. In other words, the clock number of the reference clock CLK1 between sync patterns SY1 and SY4 may not be the regular clock number that would be counted if the defected area were not present. The counter will still continue to count the clock cycles of the unstable reference clock CLK1 affected by the defected area. As a result, when the defected area is passed and the sync pattern detector 110 detects sync pattern SY4, the clock number of the counter may not be the regular value of 12; e.g. the clock number may be 11, meaning that the defected area lies between sync patterns SY1 and SY4. Accordingly, the offset detector 120 can detect the offset value of the defected area of the sector D through the comparison of the sync patterns with the regular sync patterns of the optical storage medium. After receiving the offset value carried by the offset information signal 121, the decoding module 130 is notified of the situation shown in FIG. 4.

Figure 5:
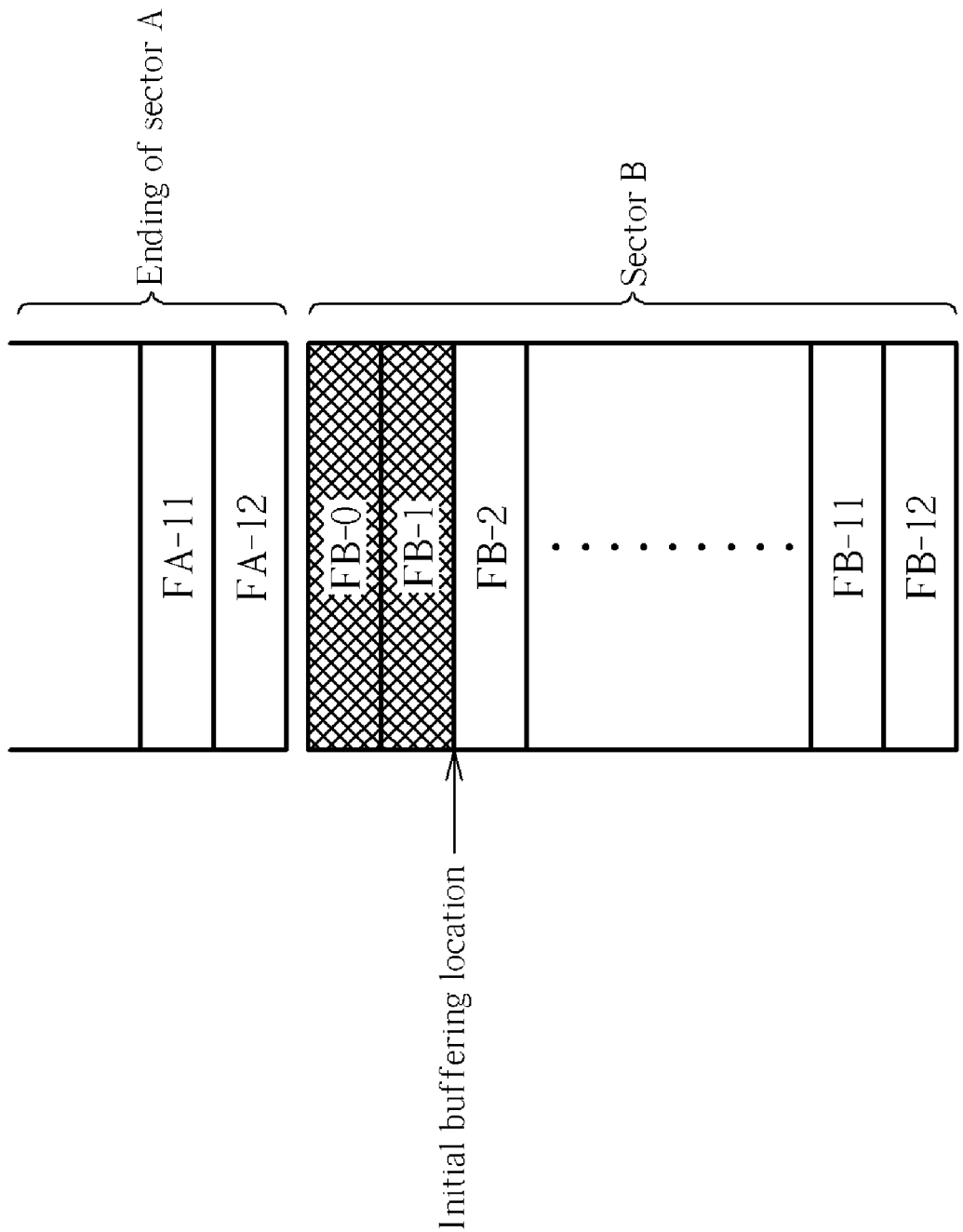
FIG. 5 illustrates an example of buffered data stored in the DRAM shown in FIG. 1.

FIG. 5 represents buffered data stored in the DRAM 134 shown in FIG. 1. Take the situation shown in FIG. 3 as an example with an assumption that a previously written frame FB-0 and a portion of a previously written frame FB-1 of sector B are overlapped by a portion of sector A. In this embodiment, if a regular value corresponding to the period of a normal frame is denoted as To, then the regular value corresponding to the period of a normal sector is denoted as 13 To since a sector comprises thirteen frames. The detection of the offset between sync pattern SY0 of sector A and sync pattern SY0 of sector C indicates that the abnormal value is slightly greater than 24 To since almost up to two frames out of the twenty-six frames of sectors A and B are overlapped. For example, if eighty percents of the previously written frame FB-1 is erased, then the abnormal value detected by the offset detector 120 is 24.2 To. The offset detector 120 may simply output the abnormal value as the offset value (which is carried by the offset information signal 121), so after receiving the offset value carried by the offset information signal 121, the decoding module 130 is notified that a portion of sector B is erased, where frame FB-0 and eighty percents of frame FB-1 are erased according to the calculations such as those described in the following equations:

$$13To*2-24.2To=1.8To; \text{ and}$$

$$1.8To \div To = 1, \text{ where the remainder is equal to 80\%.}$$

While other frames such as frames FA-11 and FA-12 of sector A and frames FB-2, . . . FB-12 of sector B are buffered in the DRAM 134 normally as shown in FIG. 5, the decoding module 130 leaves a region for storing frames FB-0 and FB-1 of sector B in the DRAM 134 to be blank or unchanged, or simply fills this region with a certain value, e.g. zero as a note. In this manner, the decoder 132 is capable of decoding frames FB-2, . . . , FB-12 rather than erroneously decoding the whole sector B. As a result, frame overlapping does not cause erroneously storing the encoded data, for example, frame FB-2 of sector B, in the region for storing frame FB-0 in the DRAM 134. It is noted that, although in FIG. 1 the data flow between the decoder 132 and the DRAM 134 indicates that the decoder 132 plays a role of buffering control such as that shown in FIG. 5, it is an implementation choice and not meant to be a limitation of the present invention. In another embodiment of the present invention, the functionality of buffering control mentioned above is implemented utilizing a buffering control unit playing the same role in the decoding module 130.

A second embodiment of the present invention is similar to the first embodiment, where the difference between the first and second embodiments is described as follows. In the first embodiment, the decoding module 130 buffers the encoded data into the DRAM 134 according to the offset value carried by the offset information signal 121 as previously described, and then the decoder 132 decodes the buffered data in the DRAM 134 to generate the decoded data. However, in the second embodiment, the decoding module 130 buffers the encoded data into the DRAM 134 normally, without leaving a region such as the region for storing frames FB-0 and FB-1 of sector B mentioned above to be blank or unchanged, or filling this region with a certain value. In this manner, the decoder 132 reads the buffered data in the DRAM 134 according to the offset value carried by the offset information signal 121 to decode the buffered data, in order to generate the decoded data as if the encoded data corresponding to the erased portion such as frames FB-0 and FB-1 of sector B mentioned above has been completely read. As an implementation choice rather than a limitation of the present invention, the decoder 132 may generate the decoded data by utilizing null data substituted for the encoded data corresponding to the erased portion, or by utilizing erasure information for notification of skipping decoding of the erased portion.

In a variation of either the first embodiment or the second embodiment, functionalities of at least one portion of the sync pattern detector 110 and the offset detector 120 are activated in the apparatus 100 when the decoding module 130 or a certain error detection module in the optical storage device asserts an activation signal for notifying the apparatus 100 of abnormal phenomena such as the overlap or blank region mentioned above; so the sync pattern detector 110 and the offset detector 120 in this variation simply perform their own roles when activated.

In another variation of either the first embodiment or the second embodiment, the sync pattern detector 110 detects multiple types of sync patterns within the encoded data carried by the encoded data signal Si, so the offset detector 120 may determine the offset value by checking if a sequence of the sync patterns complies with a specification of the optical storage medium. If the quality of an encoded data signal Si is considerably poor, checking if the sequence of the sync patterns complies with a predetermined sequence, e.g. a sequence {SY0, SY5, SY1, SY5}, will strengthen the reliability of the detection performed by the sync pattern detector 110 or the offset detector 120.

In another variation of either the first embodiment or the second embodiment, the sync pattern detector 110 also detects multiple types of sync patterns within the encoded data carried by the encoded data signal Si, the difference being, the offset detector 120 determines the offset value as follows. The offset detector 120 of this variation checks if a sequence of a plurality of continuous sync patterns outputted from the sync pattern detector 110 complies with any of all the sequences allowable according to the specification of the optical storage medium. Taking the situation shown in FIG. 3 as an example, the offset detector 120 receives the sequence {SY4, SY7, $SY_{n+1}$, $SY_{n+2}$} and finds the abnormal phenomenon in the linking or defect area. The sequence {SY4, SY7} indicates the relative location of the last frame corresponding to the sync pattern SY7 with respect to sector A, and the sequence {$SY_{n+1}$, $SY_{n+2}$} indicates the relative location of the frame corresponding to sync pattern $SY_{n+1}$ with respect to sector B. Therefore, the offset detector 120 detects and generates the offset value according to the two relative locations. It is noted that if sync pattern $SY_{n+1}$ in the sequence {SY4, SY7, $SY_{n+1}$, $SY_{n+2}$} mentioned above is not supposed to be repeated in any sector according to the specification of the optical storage medium, the offset detector 120 may determine the relative location of the frame corresponding to sync pattern $SY_{n+1}$ with respect to sector B according to sync pattern $SY_{n+1}$ rather than both sync patterns of the sequence {$SY_{n+1}$, $SY_{n+2}$}. According to another embodiment, the offset value carried by the offset information signal 121 can be sent to the decoding module 130 utilizing various forms reflecting information related to the offset value as long as the implementation of the present invention is not hindered.

Although the embodiments are described utilizing the DVD-RW disc and the DVD-RW drive as the optical storage medium and the optical storage device, respectively, this is not a limitation. Other kinds of optical storage media such as a DVD+RW disc or a Blu-ray disc and the corresponding optical storage device such as a DVD+RW drive or a Blu-ray drive are applicable to other embodiments of the present invention.

It is an advantage of the present invention that encoded data around a linking or defect area on the optical storage medium such as a DVD+RW disc, a DVD-RW disc, or a Blu-ray disc are rarely abandoned in units of the whole error correction unit such as an ECC block.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for decoding encoded data around a specific area on an optical storage medium, the specific area having discontinued data, the method comprising:
   (a) detecting at least one type of sync patterns within the encoded data;
   (b) determining an offset value corresponding to the specific area according to the detected sync patterns; and
   (c) decoding the encoded data according to the offset value to generate decoded data.

2. The method of claim 1, wherein step (c) further comprises:
   buffering the encoded data according to the offset value to generate buffered data; and
   decoding the buffered data to generate the decoded data.

3. The method of claim 1, wherein step (c) further comprises:
   buffering the encoded data to generate buffered data; and
   reading the buffered data according to the offset value to decode the buffered data for generating the decoded data.

4. The method of claim 1, wherein the specific area is a linking area on the optical storage medium.

5. The method of claim 1, wherein the offset value is determined according to two sync patterns having the same type.

6. The method of claim 5, wherein the offset value is determined by counting a clock number between the two sync patterns having the same type according to a reference clock.

7. The method of claim 1, wherein the specific area is a defected area on the optical storage medium.

8. The method of claim 7, wherein the offset value is determined according to two sync patterns on different sides of the defected area.

9. The method of claim 8, wherein the offset value is determined by counting a clock number between the two sync patterns on different sides of the defected area according to a reference clock.

10. The method of claim 1, wherein step (b) further comprises determining the offset value through checking if a sequence of the sync patterns complies with a specification of the optical storage medium.

11. An apparatus for decoding encoded data around a specific area on an optical storage medium, the specific area having discontinued data, the apparatus comprising:
   a sync pattern detector for detecting at least one type of sync patterns within the encoded data;
   an offset detector coupled to the sync pattern detector for determining an offset value corresponding to the specific area according to the detected sync patterns; and
   a decoding module coupled to the offset detector for decoding the encoded data according to the offset value to generate decoded data.

12. The apparatus of claim 11, wherein the decoding module further comprises:
   a buffer for buffering the encoded data to generate buffered data; and
   a decoder coupled to the buffer for decoding the buffered data to generate the decoded data.

13. The apparatus of claim 12, wherein the decoding module buffers the encoded data into the buffer according to the offset value.

14. The apparatus of claim 12, wherein the decoder reads the buffered data according to the offset value to decode the buffered data for generating the decoded data.

15. The apparatus of claim 11, wherein the specific area is a linking area on the optical storage medium.

16. The apparatus of claim 15, wherein the offset detector determines the offset value by counting a clock number between two sync patterns having the same type according to a reference clock.

17. The apparatus of claim 11, wherein the specific area is a defected area on the optical storage medium.

18. The apparatus of claim 17, wherein the offset detector determines the offset value by counting a clock number between two sync patterns on different sides of the defected area according to a reference clock.

19. The apparatus of claim 11, wherein the offset detector determines the offset value through checking if a sequence of the sync patterns complies with a specification of the optical storage medium.

20. The apparatus of claim 11, wherein the encoded data is recorded discontinuously on the optical storage medium.

* * * * *